US006571304B1

(12) United States Patent
Basham et al.

(10) Patent No.: US 6,571,304 B1
(45) Date of Patent: May 27, 2003

(54) CONTROL SYSTEM FOR USING MEMORY ON CARTRIDGES TO OVERCOME TAPE DRIVE PROBLEMS

(75) Inventors: Robert Beverley Basham, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,477

(22) Filed: Dec. 6, 1999

(51) Int. Cl.[7] ................................................. G06F 3/00
(52) U.S. Cl. ........................... 710/53; 710/72; 360/71; 360/132
(58) Field of Search ............................... 710/52, 53, 62, 710/65, 72; 360/71, 132

(56) References Cited

U.S. PATENT DOCUMENTS

| 4,338,644 | A |   | 7/1982 | Staar ........................... 360/132 |
| 4,723,181 | A | * | 2/1988 | Hickok ......................... 360/132 |
| 5,606,467 | A |   | 2/1997 | Hirata .......................... 360/69 |
| 5,636,078 | A | * | 6/1997 | Tsai ............................ 360/132 |
| 5,784,227 | A |   | 7/1998 | Kitamura et al. ............ 360/132 |
| 5,899,576 | A |   | 5/1999 | Fukuzawa ..................... 386/52 |
| 6,172,833 | B1 | * | 2/2001 | Fry et al. ...................... 360/71 |

FOREIGN PATENT DOCUMENTS

JP          7314675         11/1995

* cited by examiner

Primary Examiner—Jeffrey Gaffin
Assistant Examiner—Harold Kim
(74) Attorney, Agent, or Firm—James A. Pershon

(57) ABSTRACT

A magnetic tape cartridge includes a non-volatile semiconductor memory storing either a portion of the same data as that to be written to the tape or at least control data sufficient to recover from a delaying tape drive operation or from a mechanical failure in the tape drive thereby permitting signaling to a central processing unit an assurance that the data transferring by the CPU will be correctly written onto the tape. The host data can be directly transferred to the cartridge memory if the cartridge memory is fast enough and large enough to handle the transfer. An intermediate high speed non-volatile memory in the drive is necessary if the cartridge memory is too slow to handle the direct transfer or too small to handle the data transferred by the CPU. The cartridge memory then will contain command data sufficient to control the transfer of the data from the non-volatile drive memory to the tape. Thus the CPU can be assured that the host data sent to the tape drive will be preserved irrespective of any tape drive failure or delaying motion.

10 Claims, 3 Drawing Sheets

CONTROL SYSTEM FOR USING MEMORY ON CARTRIDGES TO OVERCOME TAPE DRIVE PROBLEMS

BACKGROUND OF THE INVENTION

The present invention relates generally to a cassette for containing a magnetic tape. More specifically, the present invention relates to a cassette (i.e., cartridge) which contains a magnetic tape and a non-volatile semiconductor memory with the semiconductor memory storing either the same data as that on the tape or at least data sufficient to recover from a mechanical failure in the drive.

FIELD OF THE INVENTION

As is well known, magnetic tape cassettes have been extensively used for storing data in a data processing system. The tape cassette is used in association with a data recording/reproducing device which is interconnected with a host computer to store data required by the host computer perhaps in a later processing operation. The data is magnetically written onto the tape in serial fashion on what could be a plurality of such data tracks in one tape cartridge. The serialization of the data onto the tape is generally much slower than the data transfer in the host computer. It is common practice to employ an electronic data buffer between intermediate data units such as the host computer and the recording and reproducing apparatus for enhancing data exchanges between the units. It has been found particularly advantageous to provide an electronic buffer between an electromechanical data processing device and a completely electronic data processing unit. This is an example of, for instance, a magnetic tape drive coupled to a central processing unit including the host computer. The idea is to mask or hide the relatively slow electromechanical device action from the electronic data processing unit.

This has led to the practice of first storing all of the data for the magnetic tape device onto a buffer and then transferring the data at a later time or at the leisurely operation of the tape device to the magnetic tape. The electronic data buffer is interposed between the CPU and the magnetic tape drive. The buffer memory could be shared by a plurality of the tape drives such that the number of buffer storage segments of the buffer is less than the number of tape drives. Then there became a problem where the volatility of the data in the buffer caused a loss of data when the power was interrupted in the CPU. Non-volatile read/write memory was then provided as the buffer unit wherein the data was permanently stored in the non-volatile memory until further action could be taken to either write the data from the non-volatile memory onto the tape or to continue action of reading the data from the magnetic tape to the non-volatile memory. However, there are problems that current buffer tape drives cannot handle even with an intervening non-volatile data buffer. It is difficult in any intermediate buffer system to ensure the data is safely on the tape cartridge or that the data has been safely removed from the cartridge and can still be accessed by the CPU.

It is, therefore, an object of the present invention to provide a method and apparatus for providing a tape cassette which includes the magnetic tape and a non-volatile read/write memory on the cartridge itself. The non-volatile read/write semiconductor memory accepts the data from the CPU and then either transmits the data from the non-volatile memory to the tape drive or stores sufficient data as a backup to accomplish an eventual transfer of the data by the tape drive system to the tape.

DESCRIPTION OF THE PRIOR ART

Prior to the present invention, tape cassettes or cartridges having non-volatile memory packages mounted onto the cartridges stored only status data of the tape cartridge for usage by the tape drive to assess the value or the placement of the data. For instance, U.S. Pat. No. 5,606,467, issued on Feb. 25, 1997 to H. Hirata, and entitled, "Apparatus For Continuously Recording and Reproducing of Data From a Magnetic Tape Cassette Comprising A Semiconductor Memory", discloses a tape drive which includes a semiconductor memory that outputs signals reproduced from the semiconductor memory for providing a continuation of the audio sounds such as music when the magnetic tape is in a reversal mode or is switching between channels. The semiconductor memory stores a particular signal which is generally not the same as the data stored on the magnetic tape. The purpose is not to provide safety in the storage of the data such as is a requirement in a CPU but to provide a continuous operation without a hesitation.

It is, therefore, another object of the present invention to provide a method and apparatus for overcoming any data transfer problems in a data processing unit that can be caused by mechanical motion problems in the tape drive itself.

U.S. Pat. No. 4,338,644, issued on Jul. 6, 1982 to T. C. J. L. Staar and entitled, "Magnetic Tape Cassettes Provided With Memory Circuits For Storing Information" discloses the use of electronic memories including semiconductor circuits mounted in a cassette housing for storing data relating to the media stored in the housing. The semiconductor memory circuits represent the status of the memory circuits, the information as to the media contained within the cassette, such as text information identifying the cassette, its length, its magnetic bias and equalization value, or the titles of the recordings on the tape in the form of an index or listing. The semiconductor memory can accept rating signals that represent information which changes or which the user may desire to change such as the instantaneous position of the tape, the location of different programs recorded on the media, or the data fields recorded on the media. Thus, in the '644' patent, the semiconductor memory only stores information pertaining to the present status of the media and the cassette or to control the operation of the recording device when the cassette is installed into that device. There is no showing in the '644' patent, and which is required in a data unit, of a semiconductor memory associated with the cassette that ensures that the data is guaranteed to be on the tape. There is no showing in the '644' patent of the use of a semiconductor memory in a media cartridge that can ensure to a host computer that the data is correctly recorded on the media, or will correctly be recorded on the media, or that the data has been transferred from the media to a separate buffer device.

U.S. Pat. No. 5,899,576 issued on May 4, 1999 to K. Fukuzawa, and entitled, "Apparatus For Recording And Reproducing Data On And From A Storage Device Having A Plurality Of Kinds Of Storage Media Integrally Provided Therein", discloses a method of copying data from both a magnetic tape and a non-volatile memory on the tape cassette to the recording apparatus. The data in the non-volatile memory includes information of the content of the recorded data on the tape and does not contain information about the guarantee of having the required data on the tape.

U.S. Pat. No. 5,784,227, issued on Jul. 21, 1998 to H. Kitamura, et al, and entitled, "Tape Cassette Mounted With IC Memory Package and IC Connecting System For The Tape Cassette" and a Japanese abstract of application JP07314675, filed on Nov. 8, 1995 by Y. Takayama, et al, and entitled, "Data Recording And Reproducing Device" both disclose methods of interfacing a tape cassette including a non-volatile memory to a drive and do not disclose usages of the data in the non-volatile memory to solve streaming data drive problems.

SUMMARY OF THE INVENTION

In the preferred embodiments of the present invention, a data processing system having a host central processing unit connected to at least a tape drive storage device which includes a non-volatile semiconductor memory located on the tape cartridge storing either a portion of the same data as that to be written to the tape or at least control data sufficient to recover from a delaying tape drive operation or from a mechanical failure in the tape drive thereby permitting signaling to the host central processing unit an assurance that the data transferring by the host will be correctly written onto the tape or at least correctly stored. The host data can be directly transferred to the cartridge memory if the cartridge memory is fast enough and large enough to handle the transfer. An intermediate high speed non-volatile memory in the drive is necessary if the cartridge memory is too slow to handle the direct transfer or too small to handle the data transferred by the CPU. The cartridge memory then will contain command data sufficient to control the transfer of the data from the non-volatile drive memory to the tape. Thus the CPU can be assured that the host data sent to the tape drive will be preserved irrespective of any tape drive failure or delaying motion.

In accordance with the present invention, method and apparatus are provided for hiding mechanical motion in a tape drive which can cause delays in the transfer of data to an attached CPU or from a CPU by storing the control information and data in a non-volatile memory located in the magnetic tape cartridge. The non-volatile memory on the magnetic tape cartridge is used as a buffer to store the control information and the data to avoid backhitch or other mechanical motion problems. The invention specifically is to the data stored in the non-volatile storage device that is physically a part of the media cartridge data that is useful in association with a CPU. The non-volatile storage device can be used to hold information about that specific media cartridge, the media and the cartridge, and the data on the media.

Accordingly, one of the principle objects of this invention is to overcome the disadvantage of conventional cassettes containing information for data processing equipment by providing a semiconductor non-volatile memory associated with the cassette that ensures that the data in the cassette is prepared to be safely stored onto the tape cartridge. The control information of data useful to the host processor is stored in a non-volatile memory such as a semiconductor memory attached to the media tape cartridge. The non-volatile memory on the cartridge acts as a buffer to store control information and data, to avoid backhitch tape stoppage or other mechanical motion problems. After the control information is written to the cartridge media, subsequent host data sent from the host is stored in the buffers associated with the cartridge drive units. When the tape drive is resynchronized from the backhitch or a mechanical motion error, the control information is first written to the media from the cartridge memory and the host data is then written from the buffer to the media. Thus, the data transfer from the host processor is not affected by the mechanical motion situations encountered in the drive units. The non-volatile memory is electrically alterable so that the data can be changed to represent the present information of the cartridge, its associated drive unit, the buffer units temporarily storing the data, and the host processing unit.

In many tape device applications for use to transfer data to or from a central processing unit, in order to ensure that the data is guaranteed to be on tape, the tape drive buffer must be emptied frequently. This ensures a reliable checkpoint but at a lowering of the data transfer performance. Non-volatile tape buffer memories are now required to be larger requiring longer backhitches (back or reverse drive motions) to ensure the correct data transfer. As a result, performance suffers.

This invention is directed to the use of non-volatile semiconductor memory located on the cartridge itself to solve this problem. If there is a high speed interface to the non-volatile cartridge memory, then the data is directly written to the non-volatile cartridge memory when a synchronize buffer command is received from the CPU. Interlocks like a unique key, append point, and time storage could be used to ensure format integrity. As soon as all the data is written to the non-volatile memory on the cartridge, the system application could resume command processing which could typically be more transfer of data to the tape cassette or tape cartridge.

The second aspect of the invention is related to the use of a low speed interface to the non-volatile memory on the cassette cartridge. A non-volatile high-speed drive memory is used and must be capable of storing all of the tape cassette data. When a synchronize of the buffer command is requested by the CPU, all of the data is written to the non-volatile drive memory. Interlocks like a unique key, append point, and time stamp might be used to ensure format integrity. Once the data is all written to the drive non-volatile memory, the command processing application is resumed. If a permanent write error or temporary power loss occurs before the data that is located in the non-volatile drive memory could be written successfully to the tape medium in the cassette, the data is directly written to the non-volatile memory in the cassette. In the case of a permanent write error, the data would be written to the cartridge non-volatile memory before reporting the permanent error. In the case of a power loss, the data would be written to the non-volatile cartridge memory before unloading the tape. This alternative aspect of the invention simplifies tape error recovery, since the data would not have to be recovered out of the non-volatile drive buffer. After the control information is written to the cartridge memory, subsequent host data sent from the host CPU is stored in the tape drive buffers. When the tape drive is resynchronzied from the backhitch or other mechanical motion, the control information is first written to the magnetic tape from the cartridge memory. The host data is then written from the tape drive buffer directly to the tape media. Thus, the data transfer from the host CPU is not affected by the mechanical motion problem encountered in the tape drive.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
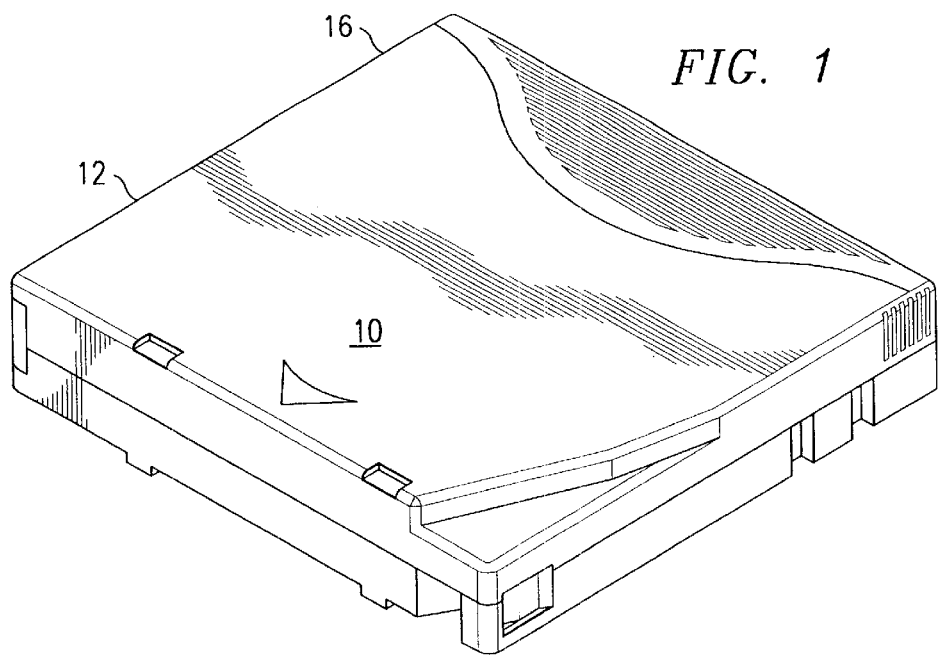
FIG. 1 is a plan view of a magnetic tape cartridge constructed in accordance with a preferred embodiment of the present invention, particularly illustrating the arrangement of respective components in the cartridge.
Figure 2:
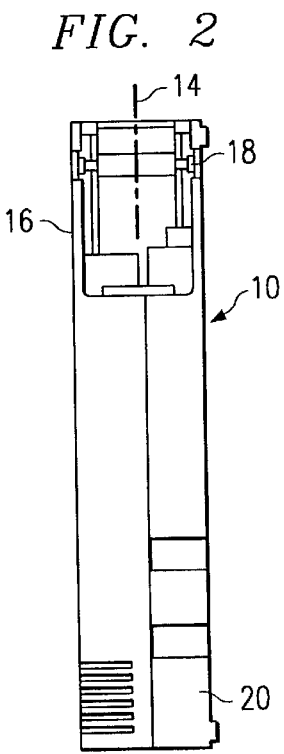
FIG. 2. is a perspective view of a corner of the cartridge of FIG. 1 including the non-volatile memory of the present invention.

The present invention will be described in detail hereinafter with reference to the accompanying drawings, which illustrate preferred embodiments of the present invention. In the drawings, FIG. 1 is a plan view which illustrates a cartridge useful to the present invention. FIG. 1 shows a general view of a tape cartridge housing 10 including the different sides of the cartridge itself. The side of interest is the left side 12 as shown in FIG. 2. Referring to FIG. 2, the left side 12 of the cartridge 10 is the interface side and includes a leader block 14 held in a receiving well 16 in one corner of the cartridge. The cartridge of FIG. 1 includes a single reel tape cartridge (not shown) for an automatic threading tape drive. The reel includes layers of magnetic tape with the leader block attached to the free end of the tape. The leader block 14 is held in the receiving well 16 in one corner of the cartridge when the cartridge is out of the tape drive. The leader block 14 connects with a threading pin 18 in the threading tape drive (not shown) for threading the tape through the drive to a take-up reel hub. The leader block 14 includes a conforming section that fits the leader block into a channel of the tape drive. Reference is made to U.S. Pat. No. 4,426,047 issued on Jan. 17, 1984, and assigned to the assignee of the present invention to show a more complete outline of a tape cartridge with a leader block and a tape drive that can be useful with interfacing with the tape cartridge. The tape cartridge also includes on its left side 12 as shown in FIG. 2 a non-volatile memory store 20 generally being a semiconductor memory firmly mounted to the left side 12 of the cartridge housing 10.

The magnetic tape cartridge of the present invention is entirely the same as many single reel conventional cartridges in structure with respect to the aforementioned elements. A characterizing feature of the magnetic tape cartridge resides in the semiconductor memory which makes it possible to perform a recording/reproducing operation in response to an electrical signal transmitted from the outside of the magnetic tape cartridge. The semiconductor memory 20 is incorporated in the cartridge 10 on its left side as shown in FIG. 2 in order to be positioned to interface with the tape drive as will be discussed in more detail later. U.S. Pat. No. 5,606,467, previously discussed in the Prior Art section of this document shows the potential interconnection between a semiconductor memory and the tape drive and is useful for an understanding of the possibility of the interconnection, it not being a part of this invention to discuss how the interface occurs. The interface of the cartridge of FIGS. 1 and 2 is further discussed with respect to the present invention as disclosed in FIG. 3.

Figure 3:
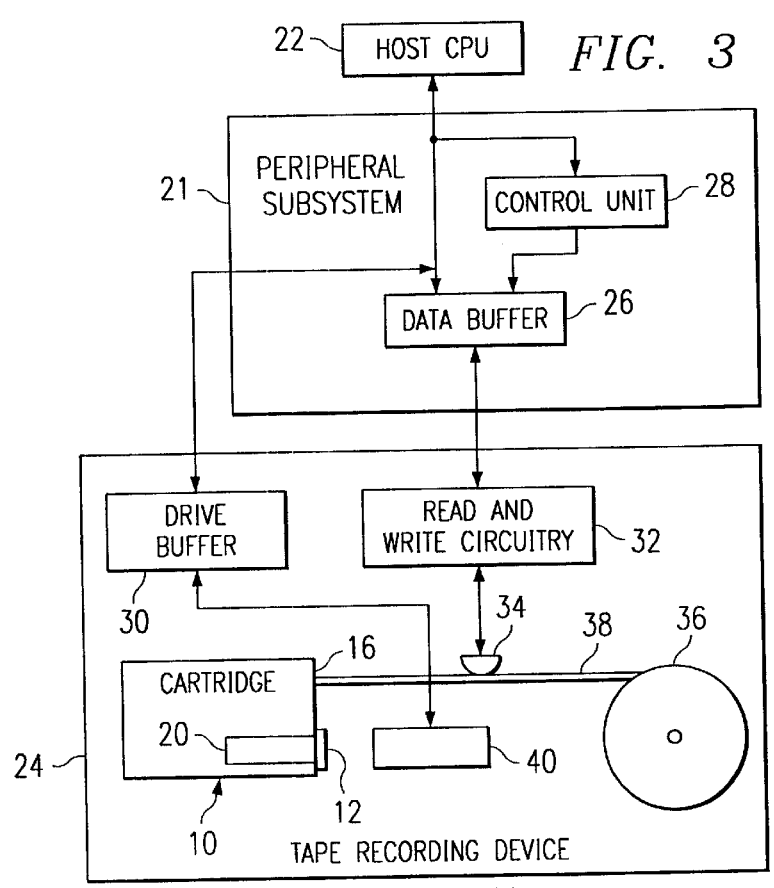
FIG. 3. is a block diagram schematically illustrating the use of the non-volatile cartridge memory in a data processing system.

FIG. 3 illustrates a peripheral subsystem 21, in simplified form, connected to a host CPU 22 for transferring data signals between such hosts and one of what could be a plurality of tape recording devices 24. Data signals are exchanged directly with the host 22 over input/output connections. Including in the peripheral subsystem 21 is a data buffer 26. It is, of course, obvious that other units are required within the peripheral subsystem 21. Reference is made to U.S. Pat. No. 4,428,064, issued on Jan. 24, 1984 to Hempe, et al and assigned to the assignee of the present invention, for a more thorough discussion of the control of data transfer between the host and the recording devices 24. Suffice it to say that a control unit 28 under control of the host 22 controls the operations within the peripheral subsystem 21, specifically the data buffer 26. The operation of the peripheral subsystem 21 is such that data signals are transferred from the recording device 24 to the data buffer 26, hence to the host 22 or in the reverse direction from the host 22 through the data buffer 26 to the recording devices 24. The use of the data buffer 26 provides shorter data access, better input/output channel utilization and, therefore provides more efficient data processing operations.

Still referring to FIG. 3 the recording device 24 includes a read/write circuit 32, a transducer 34 and a take-up reel 36. The regulation of a length of tape 38 from the cartridge 10 is better described in a U.S. Pat. No. 4,406,425, issued on Sep. 27, 1983 to Bullock, et al, entitled "Method and Apparatus For Regulating Webs Transported In A Reel-to-Reel Web Handler" and assigned to the assignee of the present invention. The semiconductor memory within the cartridge 10 is connected by leads to an interface 12 which is on the outer surface of the tape cartridge 10. The interface 12, when the tape cartridge 10 is inserted into the recording device 24, is placed adjacent to a connector 40 which transfers information into the semiconductor memory 20 and reads information from the semiconductor memory 20.

Figure 4:
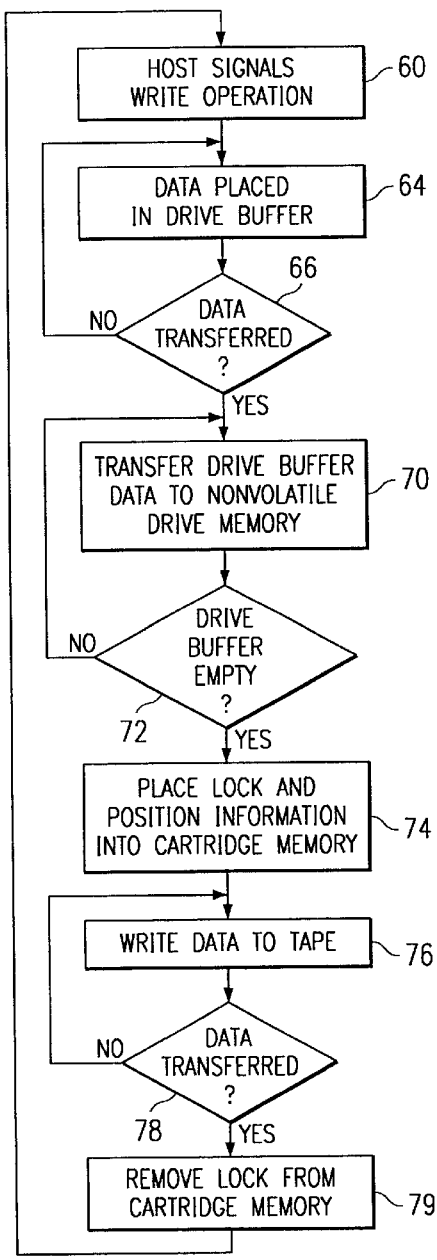
FIG. 4 is a flow chart of one solution for use of the cartridge and its non-volatile memory in association with a data processing system using the data processing system of FIG. 3.

In FIG. 3, the standard portions of the data processing system without the present invention is the host 22 transferring information to and from a data buffer 26 in the peripheral subsystem 21. The data buffer 26, in turn, transmits data to the read/write circuitry 32 in the recording device 24. The read/write circuits 32, in turn, transmit the information to and from the transducer 34 for reading and writing the data information onto the tape 38. For the present invention, the host 22 transmits drive data information into a drive buffer 30 which is connected to a connecting device 40 in the recording device 24 via the control write circuit 32. The non-volatile semiconductor memory 20 within the cartridge 10 is used as a buffer to store control information and data to avoid the backhitch problems of the tape drive or other mechanical motion operations. After the control information from the host 22 to the drive buffer 30 is written to the semiconductor memory 20, subsequent host data sent from the host is stored in the magnetic tape drive buffers 30. When the tape drive is resynchronized after the backhitch or other mechanical motion error, the control information is first written to the magnetic tape from the cartridge memory 20 and host data is then written from the tape drive buffer 30 to the tape 38. Thus the data transfer from the host processor is not affected by the mechanical motion situations encountered in the tape drive 24. The data buffer 26 retains all of the required data for storage onto the tape cartridge until the mechanical problems in the recording device 24 are solved and the host 22 has been assured that all the information is stored outside of its control and the information in the semiconductor memory 20 can take over and further control direct the further transfer of the information onto the tape 38 for storage into the tape cartridge 10. Reference is made to FIG. 4 for a flow chart showing the transfer of data to protect against any mechanical problem into the recording device 24. Referring to FIG. 3 and to FIG. 4, the host 22 starts to transfer information for writing onto the tape 38. In the writing of the data besides the data itself, drive information is transmitted to the drive buffer 30 from the host 22 and transmitted to the connecting device 40. This drive data is stored in the semiconductor memory 20.

In FIG. 4, while using the block diagram of FIG. 3, the writing of the data from the host 22 signals a write operation as shown in block 60 and the data required to continue the operation to completion is stored in the drive buffer 26 as shown in block 64. As shown in a block 60, the host signals the start of the write operation. After the drive data is placed into the drive buffer 30 as shown in block 64, the decision block 66 is triggered to look for a synchronized buffer command completion to signal that all of the data has been transferred. If the synchronized buffer command from the drive buffer 30 has not been received, the data is continued to be buffered into the drive buffer 30 as shown in block 64. When this buffer command signals that the drive buffer information is emptied and complete, the YES branch is taken from the synchronized buffer command block 66 to a block 70 where the drive buffer 30 information is transferred for storage into the semiconductor memory 20 as shown in block 70. In a decision block 72, the information is awaited and the drive buffer continues to transfer the information to the cartridge until the drive buffer 30 is empty. Then the YES decision line is taken from the decision block 72 to a block 74 where the lock and position information is placed into the cartridge semiconductor memory 20. As shown in block 76, this completes the transfer of the required information from the host 22 to the semiconductor memory 30 of the data sufficient to ensure to the host that all of the data information that the host 22 transferred to the data buffer 26 will eventually be written onto the tape 33 in the cartridge 10. The recording device 24 may be in a mechanical position where the tape itself is not being driven or is in a vacuum operation, but the host 22 is assured that the data will eventually be placed on the tape based on the information now stored within the semiconductor memory 20. The semiconductor memory 20 after this sequence controls the operation of the transfer of the data from the data buffer 26 to the tape 38 by the connecting device reading the information from the semiconductor memory 20 and controlling the continuation of the write operation which, after the problems are complete within the recording device 24, causes the write operation and the reeling of the tape 38 past the transducer 34 and all of the data information is transferred to the tape 38 irrespective of the problems within the recording device 24.

Figure 5:
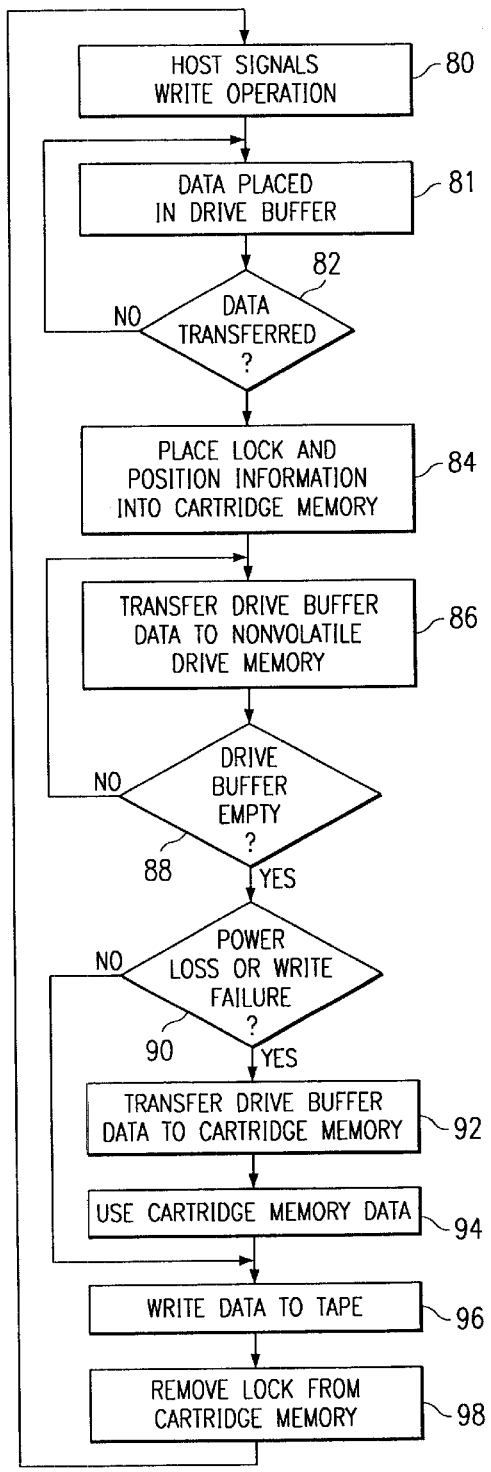
FIG. 5 is a flowchart showing the general process of the invention using the data processing system of FIG. 3.

After the data is written to the tape as shown in a block 76, the flow continues to a decision block 78 to check whether all of the data has been transferred. After the data has been transferred, the YES line is taken from the decision block 78 to a block 79. In the block 79, the lock placed into the cartridge non-volatile memory 20 in block 74 is removed. The cartridge memory 20 is freed to permit another write operation to start from the block 60 to buffer further data into the drive buffer as shown in the block 64. The lock information is placed into the cartridge memory 20 and is a unique key value for each tape cartridge. The position information is the starting block address and the ending block address of the data to be transferred to the tape. An alternate procedure to the procedure of FIG. 4 is shown in FIG. 5.

In FIG. 5, again, after the host signals a write operation as shown in a block 80, the drive information is placed into the drive buffer 26 as shown in a block 81 which is similar in operation to the block 64 of FIG. 4. The synchronized buffer command decision block 66 for the transfer of data is the same as a synchronized buffer command decision block 82 in FIG. 5. If the drive buffer synchronized command is not received, the data is continued to be placed into the drive buffer 26. After the synchronized buffer command is received showing the end of the transfer of data, the YES line is taken from the decision block 82 to a block 84 where the block and position information is placed into the cartridge memory in the same manner as shown in the block 74 of FIG. 4. After the locking position information is transferred into the cartridge memory, the flow in FIG. 5 continues to a block 86 where the drive buffer data is transferred into the semiconductor memory 20 of the cartridge 10.

The decision block 88 continues the emptying of the buffer until the drive buffer is empty and the YES line is taken. After the drive buffer information is emptied into an immediate buffer as shown in the block 88, the flow continues to a decision block 90 to check whether there has been a power loss or a write failure. If there has not been a power loss or a write failure, the flow continues because it was not necessary to use the information from the semiconductor memory in order to continue the write operation. The data is written to the tape as shown in a block 96. The flow continues until all of the data is transferred and the flow continues to a block 98 where the lock is removed from the non-volatile cartridge memory 20. If, however, there was a power failure or a write failure in the decision block 90, the YES line is taken from the block 92 to transfer the intermediate buffer into the cartridge memory 20 in order to store this information to ensure the host that sufficient information has been stored to ensure to the host that the actual data will be completed. The data information is transferred to the tape under control of the information in the semiconductor cartridge memory 20 as shown in block 94. The information stored in the cartridge memory 20 contains sufficient drive information to continue the operation of the recording device after the mechanical stoppage. The flow continues to the block 96 to write the data to the tape and then to the block 98 to remove the lock from the cartridge memory 20. An alternate embodiment of the invention for accomplishing the protection of the data and assuring the host that the correct information will eventually be stored onto the tape is shown in FIG. 6.

Figure 6:
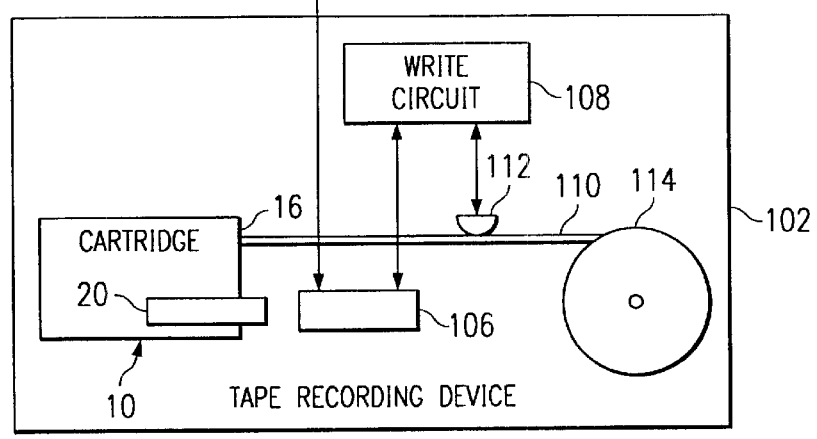
FIG. 6 is a block diagram schematically illustrating an alternate embodiment of the invention.

In FIG. 6, a host CPU 100 directly transfers all of the data information that is to be written onto the tape into the non-volatile semiconductor memory 20 of the tape cartridge 10 through a connector 106. The connector 106 interfaces directly to the cartridge memory 20. After the data is stored in the cartridge memory 20, the data is retrieved from the cartridge memory 20 through the interface to the connector 106 and is directed to a read and write circuit 108. The circuit 108 then writes the data onto a magnetic tape 110 through a transducer 112. The reading and writing onto the tape 110 takes place as the tape 110 is retrieved from the cartridge 10 as stated previously and wound onto a take-up reel 114. Once all of the data required to be written by the host CPU 100 is stored into the cartridge memory 20, the host CPU can be signaled that the data has been written onto the tape because any mechanical tape shifting such as backhitching or drive failures can be handled off-line in the tape recording device 102 without any further correspondence with the host 100. A flow chart showing the process for accomplishing a write operation, responding to the block diagram of this embodiment in FIG. 6, is shown in FIG. 7.

Figure 7:
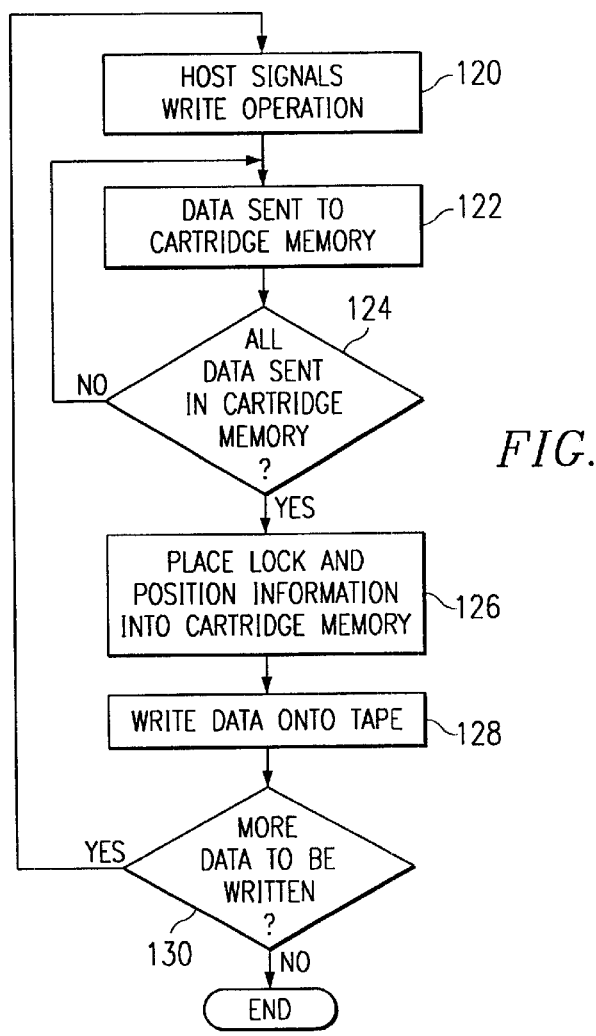
FIG. 7 is a flowchart showing the process of the invention using the media drive and control in the data processing system of FIG. 6.

Reference now to FIG. 7, the host requests a write operation as shown at block 120. The host CPU then sends the data directly to the cartridge memory 20 (see FIG. 6) as shown in block 122. Essentially, this cartridge memory acts as a buffer data store. Data continues to be sent to the cartridge memory until all the data transmitted by the host is located in the cartridge memory as shown in a decision block 124. The flow continues to a block 126 where the lock and position information is placed into the cartridge memory. The position information will be used to correctly locate the data onto the tape. At block 128, the data in the cartridge memory is written onto the tape, immediately if no drive action has occurred that requires a delay or after the backhitch, for instance, is completed. If more data is to be written onto the tape, a decision block 130 signals the host as shown in block 120 to transfer more data. If the writing is completed, the NO line is taken from the decision block 130 to end the write operation.

As disclosed in this discussion of the preferred embodiments, a non-volatile semiconductor is placed directly on a tape cartridge to provide a quicker access time for the host CPU to write data onto a non-volatile storage location without causing a delay in the host write operation resulting from a mechanical tape drive hesitation. The tape drive problems could be a required backhitch operation to reposition the tape for a correct positioning of the data onto the tape or the problem could be a drive failure. In one embodiment, only data sufficient to permit the recovery of the tape drive is placed into the cartridge semiconductor memory. The data information to be written on the tape from the host is stored in a separate non-volatile store such as a disk drive. In the second embodiment, the cartridge memory stores all of the data to be written on the tape and the data is directed for writing on the tape when the tape drive is correctly positioned to actually write the data onto the tape.

It should be recognized that the cartridge memory for the first embodiment need only store a limited amount of data, that is, data sufficient to control the transfer of the buffered data for writing onto the tape. In the second embodiment, all of the data to be written onto the tape and the write control information must be stored in the non-volatile semiconductor cartridge memory. This understandably would require a large capacity store. One semiconductor memory usable in this invention is a Dallas Semiconductor EE PROM DS2433. This memory is electrically erasable and programmable read only memory. A second semiconductor memory usable in this invention is an INTRL Strata Flash (TRADEMARK) memory.

The principles of the present invention have now been made clear in an illustrative embodiment. There will be immediately obvious to those skilled in the art many modifications of structure, arrangement, proportions, the elements, materials and components used in the practice of the invention. For instance, there are other types of cartridges and cassettes that can be used with the invention such as reel-to-reel cartridges. Also the invention should not be limited to magnetic tapes and drives. It should be obvious that other storage media such as optical is equally adaptable to this invention. The appended claims are, therefore, intended to cover and embrace any such modifications, within the true spirit and scope of the invention.

We claim:

1. A data processing system including, in combination:
    a tape cartridge including at least one reel containing tape and an electronic non-volatile semiconductor cartridge memory connected to an interface located to permit exterior access to the cartridge memory;
    a tape drive means including means to hold said tape cartridge, means to provide motion to the tape and transducing means to at least write data onto the tape in said tape cartridge;
    a host central processing unit adapted to transmit data for writing data onto the tape;
    means for connecting said host central processing unit to the tape cartridge interface for storing host data into the cartridge memory; and
    control means connected to the interface to retrieve the stored host data from the cartridge memory and to control the transducing means to write the host data onto the tape.

2. A data processing system as defined in claim 1 wherein said host central processing unit transmits host data directly to the tape cartridge interface for storage into the cartridge memory and said control means directly retrieves the stored host data and transmits the host data to the transducing means for writing onto the tape.

3. A data processing system as defined in claim 1 further includes a non-volatile drive memory connected for accepting the host data from said host central processing unit with the cartridge memory storing write control information from said host central processing unit, said control means retrieving the write control from the cartridge memory to thereby cause the drive memory to transmit the host data to the transducing means for writing onto the tape.

4. A data processing system including, in combination:
    a tape cartridge including at least one reel containing tape and an electronic non-volatile semiconductor cartridge memory connected to an interface located to permit exterior access to the cartridge memory;
    a tape drive means including means to hold said tape cartridge, means to provide motion to the tape, a control write circuit connected to the interface, and transducing means to at least write data onto the tape in said tape cartridge;
    a host central processing unit adapted to transmit data for writing data onto the tape; and
    means for connecting said host central processing unit to the tape cartridge interface for storing host data into the cartridge memory;
    said control write circuit connected to the interface to retrieve the stored host data from the cartridge memory and to control the transducing means to write the host data onto the tape.

5. A data processing system including, in combination:
    a tape cartridge including at least one reel containing tape and an electronic non-volatile semiconductor cartridge memory connected to an interface located to permit exterior access to the cartridge memory;
    a tape drive means including means to hold said tape cartridge, means to provide motion to the tape, a drive buffer, a control write circuit connected to the drive buffer and to the interface, and transducing means to at least write data onto the tape in said tape cartridge;
    a host central processing unit adapted to transmit data and control information for writing data onto the tape;
    means for connecting said host central processing unit to the drive buffer for storing host data;
    means for connecting the control write circuit to the interface, and
    said control write circuit connected to the interface to retrieve the stored control information from the cartridge memory and to control the transducing means to write the host data onto the tape from the drive buffer.

6. A method of controlling a data processing system including a host central processing unit adapted to transmit data and control information for writing data, a tape cartridge including at least one reel containing tape and an electronic non-volatile semiconductor cartridge memory connected to an interface located to permit exterior access to the cartridge memory; a tape drive means including means to hold said tape cartridge, means to provide motion to the tape, a drive buffer, a control write circuit connected to the drive buffer and to the interface, and transducing means to at least write data onto the tape in said tape cartridge, means for connecting said host central processing unit to the drive buffer for storing host data, means for connecting the control write circuit to the interface, with said control write circuit connected to the interface to retrieve the stored control information from the cartridge memory and to control the transducing means to write the host data onto the tape from the drive buffer, said method for recording host data onto the tape from the host central processing unit while releasing the host from further control requirements after transmitting the host data and insulating the host from recording delays, said method including the steps of:

receiving a write operation as signaled by the host;

placing the data received from the host in said write operation into the drive buffer;

transferring the data in the drive buffer to the non-volatile drive memory after all the data is transferred to the drive buffer;

placing a lock and position information of the drive buffer data into the cartridge memory;

writing the data from the drive memory to the tape; and removing the lock and key information from the cartridge memory if all of the data is transferred to the tape, otherwise using the lock and position information to control the writing of the data to the tape.

7. A method of controlling a data processing system including a host central processing unit adapted to transmit data and control information for writing data, a tape cartridge including at least one reel containing tape and an electronic non-volatile semiconductor cartridge memory connected to an interface located to permit exterior access to the cartridge memory; a tape drive means including means to hold said tape cartridge, means to provide motion to the tape, a drive buffer, a control write circuit connected to the drive buffer and to the interface, and transducing means to at least write data onto the tape in said tape cartridge, means for connecting said host central processing unit to the drive buffer for storing host data, means for connecting the control write circuit to the interface, with said control write circuit connected to the interface to retrieve the stored control information from the cartridge memory and to control the transducing means to write the host data onto the tape from the drive buffer, said method for recording host data onto the tape from the host central processing unit while releasing the host from further control requirements after transmitting the host data and insulating the host from recording delays, said method including the steps of:

receiving a write operation as signaled by the host;

placing the data received from the host in said write operation into the drive buffer;

placing a lock and key information from the data placed into the drive buffer into the cartridge memory;

transferring the data in the drive buffer to the non-volatile drive memory;

checking for a power loss or a write failure after the data in the drive buffer is transferred to the non-volatile memory;

writing the data to the tape and removing the lock from the cartridge memory if no power loss or write failure has occurred;

otherwise transferring the drive buffer data to the cartridge memory; and using the data from the cartridge memory to perform the step of writing the data to the tape and removing the lock from the cartridge memory if a power loss or write failure has occurred.

8. A method of controlling a data processing system including a host central processing unit adapted to transmit data and control information for writing data, a tape cartridge including at least one reel containing tape and an electronic non-volatile semiconductor cartridge memory connected to an interface located to permit exterior access to the cartridge memory, a tape drive means including means to hold said tape cartridge, means to provide motion to the tape, a control write circuit connected to the interface, and transducing means to at least write data onto the tape in said cartridge, and means for connecting said host central processing unit to the tape cartridge interface for storing host data into the cartridge memory, said control write circuit connected to the interface to retrieve the stored host data from the cartridge memory and to control the transducing means to write the host data onto the tape, said method for recording host data onto the tape from the host central processing unit while releasing the host from further control requirements after transmitting the host data and insulating the host from recording delays, said method comprising the steps of:

receiving a write operation as signaled by the host;

placing the data received from the host in said write operation into the cartridge memory;

placing a lock and key information from the data placed into the cartridge memory after all the data is sent to the cartridge memory;

writing the data from the cartridge memory onto the tape;

determining whether more data is to be written to the tape; and ending the write procedure if no more data is to be written to the tape, otherwise returning to the step of placing the data received from the host in said write operation into the cartridge memory and continuing the process until no more data is to be written to the tape.

9. A process for recording host data onto a tape from a host central processing unit while releasing the host from further control requirements after transmitting the host data and insulating the host from recording delays with the tape cartridge including at least one reel containing tape and an electronic non-volatile semiconductor cartridge memory connected to an interface located to permit exterior access to the cartridge memory; and the tape drive means including means to hold said tape cartridge, means to provide motion to the tape and transducing means to at least write data onto the tape in said tape cartridge and means for connecting said host central processing unit to the tape cartridge interface for storing host data into the cartridge memory together with control means connected to the interface to retrieve the stored host data from the cartridge memory and to control the transducing means to write the host data onto the tape, said process comprising the steps of:

receiving a write operation as signaled by the host;

placing the data received from the host in said write operation into the drive buffer;

placing a lock and key information from the data placed into the drive buffer into the cartridge memory;

transferring the data in the drive buffer to the non-volatile drive memory;

checking for a power loss or a write failure after the data in the drive buffer is transferred to the non-volatile memory;

writing the data to the tape and removing the lock from the cartridge memory if no power loss or write failure has occurred;

otherwise transferring the drive buffer data to the cartridge memory; and using the data from the cartridge memory to perform the step of writing the data to the tape and removing the lock from the cartridge memory if a power loss or write failure has occurred.

10. A process for recording host data onto a tape in a cartridge in a tape drive from a host central processing unit while releasing the host from further control requirements after transmitting the host data and insulating the host from recording delays with the tape cartridge including at least one tape cartridge interface located to permit exterior access to the cartridge memory; and the tape drive means including means to hold said tape cartridge, means to provide motion to the tape and transducing means to at least write data onto the tape in said tape cartridge and means for connecting said host central processing unit to the tape cartridge interface for storing host data into the cartridge memory together with control means connected to the interface to retrieve the stored host data from the cartridge memory and to control the transducing means to write the host data onto the tape, said process comprising the steps of:

receiving a write operation as signaled by the host;

placing the data received from the host in said write operation into the cartridge memory;

placing a lock and key information from the data placed into the cartridge memory after all the data is sent to the cartridge memory;

writing the data from the cartridge memory onto the tape;

determining whether more data is to be written to the tape; and ending the write procedure if no more data is to be written to the tape, otherwise returning to the step of placing the data received from the host in said write operation into the cartridge memory and continuing the process until no more data is to be written to the tape.

\* \* \* \* \*